United States Patent Office 3,463,687
Patented Aug. 26, 1969

3,463,687
METHOD OF PRODUCING LOW DENSITY RIGID SHEETS OF SYNTHETIC PLASTIC
Allan G. Folsom, Reading, Mass., and Peter J. Perron, Ossining, N.Y., assignors to The General Tire & Rubber Company, a corporation of Ohio
No Drawing. Filed Apr. 26, 1966, Ser. No. 545,303
Int. Cl. B32b 5/20
U.S. Cl. 156—79                                              10 Claims

ABSTRACT OF THE DISCLOSURE

Low density rigid sheets of synthetic plastic material free of surface blemishes or defects and capable of being molded by vacuum forming techniques into shaped articles are made by sandwiching a sheet of thermoplastic material containing a heat-activatable blowing agent between a pair of impervious sheets of thermoplastic material and expanding the inner sheet under controlled conditions.

FIELD OF THE INVENTION

The production and fabrication of both flexible and rigid sheets of plastic material is a highly developed art. Such products may be made in a number of basically different forms including solid unilayer sheets, cellular unilayer sheets of low density, cellular sheets which have been provided with impervious skin coats without recourse to lamination (see U.S. 3,054,146), laminated multilayer products of all solid sheets and laminated multilayer sheets comprising one or more layers of cellular structure. The present invention concerns the latter type of product.

Many types of rigid plastic materials having good strength characteristics have been developed, e.g., rigid forms of acrylonitrile-butadiene-styrene copolymers. Since the density of such rigid plastics is too great for many applications, laminated products comprising two outer impervious layers and a cellular central layer have come under consideration for reducing overall weight of sheets made from such plastic materials while retaining the good abrasion resistance, tensile strength and other desirable properties which are inherent in the plastics. Hence, the production of laminated multilayer products having a foamed central core with the laminated sheet being composed of the rigid, high impact polymers and which can be molded, particularly by vacuum forming techniques, have been desired items of commerce.

Laminated plastic sheets of this type must possess certain basic qualities if they are to be acceptable to the trade. This makes their production something more than just the simple lamination of two exterior sheets to a central cellular core. Thus, such laminates should be uniform in density and thickness. Also, the outer surfaces of the sheet must be unblemished, and of uniform appearance, whether they be polished or embossed. Additionally, there must be a high degree of adhesion between the two exterior layers and the central core and a lack of bubbles or similar areas of nonadhesion between the core and surface sheets. If the sheets are to be of use in vacuum molding or similar forming procedures, these qualities must remain in spite of the heating and forming operations, e.g., the action of heating and bending must not produce delamination.

The ability of thermoplastic materials including thermoplastic sheets, to be formed or molded readily by simple application of heat and pressure is one of the most important features of these products. Once suitable molds have been prepared, large numbers of molded articles may be fabricated with a minimum expenditure of time and labor. In general, molding of thermoplastic resin articles can be accomplished in a variety of ways, but so-called "vacuum-forming" techniques are particularly useful for the molding of articles of large surface or volume from sheet stock because of the simplicity and low cost of molds in such operations. Not only is it known to mold unilayer plastic sheets by this method, but it has also been proposed to employ such techniques in the molding of laminated sheets including those containing a cellular core (see U.S. 3,041,220 and 3,070,817). The present invention concerns certain improvements in the production of laminated rigid sheets having a cellular core which are particularly useful in making molded articles via vacuum forming procedures.

The production of laminated cellular sheets from rigid thermoplastic materials, aside from the indicated requirements connected with the lamination of such sheets into multilayer products presents some special problems. One of the principal methods of forming cellular plastics developed heretofore involves the use of decomposable blowing agents that can be activated by application of elevated temperatures. A host of compounds have been found which decompose rapidly and almost quantitatively when heated above a certain threshold temperature, referred to as the "activation temperature" (see, for example, U.S. 3,017,406). Such blowing agents have, in the past, normally been incorporated in plastic compositions in the manner used to include fillers, and coloring agents with the aid of high powered mixing equipment, roll mills or the like. However, with plastics of the high impact rigid type, e.g., acrylonitrile-butadiene-styrene copolymers, such method of mixing or incorporating blowing agents has proved unsatisfactory because frictional heat created by the mechanical working needed to blend the plastic base with the fillers and other additives may elevate the temperature of the plastic mass above the activation temperature of the blowing agent. Hence, if one chooses to form a multilayer low density rigid sheet of plastic material having a central core of foamed plastic using a heat decomposable blowing agent, one is faced with the problem of compounding the composition and fabricating it into the desired sheet without premature decomposition of the blowing agent in addition to solving the problems of proper adhesion between layers of the laminate, production of an unblemished surface and the like as mentioned above.

OBJECTS

A principal object of this invention is the provision of new improvements in methods of producing low density rigid sheets of synthetic plastic material capable of being molded by vacuum forming techniques into shaped articles.

Further objects include:

(1) The provision of new methods of incorporating heat decomposable blowing agents into rigid, high impact, high molecular weight synthetic polymers and the formation of laminations of compositions containing such blowing agents and polymers into sheets containing a low density, cellular, central core.

(2) The provision of new methods of forming low density rigid sheets comprising a central cellular core and two impervious surface layers free of surface blemishes or defects and possessing a high degree of strength and uniformity of adhesion between the separate layers of the lamination.

(3) The provision of improved methods of forming low density rigid sheets from acrylonitrile-butadiene-stryrene copolymers.

Other objects and further scope of applicability of the present invention will become apparent from the detailed description given thereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished according to the present invention in the production of low density rigid sheets of synthetic plastic material by the following combination of steps:

A. providing a first thermoplastic composition containing a heat-activatable blowing agent, B. forming said material into a sheet at a temperature below the activation temperature of said blowing agent, C. sandwiching the sheet formed in step B between a pair of impervious sheets of thermoplastic material, D. applying pressure to the exterior surfaces of the resulting sandwich sheet and heating the sandwich to an elevated temperature below said activation temperature to bond the separate sheets into an integral laminate, E. placing the resulting laminate between opposed flat surfaces fixed apart a predetermined distance between about 1.5 and 3 times the thickness of said laminate, and F. heating the laminate while between said surfaces above said activation temperature causing said blowing agent to expand said sheet of first thermoplastic composition, forcing the outer surfaces of said laminate into contact with said flat surfaces and creating a cellular interlayer in the laminate.

Advantageously, the heat activatable blowing agent is an azocarbonamide or a sulfonyl semicarbazide and the thermoplastic material used as the base for the compositions employed in carrying out the steps as indicated is a high impact copolymer of acrylonitrile, butadiene and styrene, e.g., a thermoplastic terpolymer containing 50–80% acrylonitrile, 5–20% butadiene and 15–45% styrene with a softening point between about 125–150° C.

New rigid sheets in accordance with the invention advantageously have a density between about 0.5–0.9 gram per cubic centimeter and a thickness between about 1 to 25 mm.

A preferred form of the new rigid sheets consists of a single central core of foamed thermoplastic acrylonitrile-butadiene-styrene copolymer and a pair of impervious outer layers of the same thermoplastic material having an embossed exterior surface.

EXAMPLES

A more complete understanding of the new methods and products of this invention may be had by reference to the following details and data concerning actual workings in accordance with the invention. In these examples and throughout the remaining specification and claims, all parts and percentages are by weight unless otherwise specified.

Example 1

The example concerns the production of low density, high rigidity sheets of acrylonitrile-butadiene-styrene terpolymer.

A smooth paste was prepared by mixing together equal parts of dioctyl phthalate and azodicarbonamide at about 15° C. in an internal paddle mixer for about 15 minutes. Then, 7:5 parts of the paste, 0.5 part of stearic acid and 100 parts of high density acrylonitrile-butadiene-styrene terpolymer (commercial ABS polymer sold under the trade name "Kralastic 2540") were charged into a Banbury mixer and worked at 150° C. until a smooth mass was obtained.

The resulting plastic mass was transferred to a roll mill heated with 90 p.s.i.g. steam to form a slab. This slab was next calendered into a 15-mil sheet on a multi-roll calender operated with the rolls at the following temperatures:

|  | Degrees C. |
|---|---|
| Offset roll | 150 |
| Top roll | 155 |
| Middle roll | 160 |
| Bottom roll | 165 |

The calendered sheet was cut into rectangular sections and ten of the sections were piled on top of one another to form a core layer.

In a separate operation, using a similar procedure of Banbury mixing and calendering, but at about 20° C. higher mixing and calendering temperatures, a sheet 10 mils in thickness was formed from 100 parts to the ABS terpolymer and 0.5 part of stearic acid. This sheet was then cut into retangular sections of the same size as the aforesaid sections.

A sandwich was formed with one of the latter sections as each of the two surface layers and the 10-ply core aforesaid as the interlayer. This sandwich was inserted between the "grained" surfaces of the platens of a hydraulic press heated to 150° C. and subjected to a pressure of about 400,000 kg. for six mins. Then the platens of the press were opened a distance of 10 mm., fixed in this position with suitable shims and the pressed sandwich was heated to 200° C. for five minutes. Foamed core sheets with embossed impervious surfaces and having a density of 0.85 g./cc. were obtained. The sheets were found to be capable of being readily shaped to desired contours by vacuum forming. The sheets were also found to be capable of increased expansion of the central core when heated above 200° C. without restriction as to expansion.

Example 2

Core sheets for laminated panels formed of acrylonitrile-butadiene-styrene copolymer were prepared using the materials in the parts by weight and conditions as reported in the following table:

TABLE I

| Item | 1 | 2 | 3 | 4 | 5 | 6 | 7 |
|---|---|---|---|---|---|---|---|
| (A) "K-2540" | 120 | 120 | 120 | 100 | 100 | 100 | 100 |
| (B) "Cellogen AZ" | 15 | | | | | | |
| (C) "Cellogen BH" | | 15 | | | | | |
| (D) "Kempore 60" | | | | 7.5 | 7 | 12 | 7 |
| (E) Dioctylphthalate | | | | | 5 | 5 | 10 |
| (F) Stearic acid | 0.5 | 0.25 | 0.25 | 0.5 | 0.25 | | 0.25 |
| (G) "IVTI" | | | 10 | | | | |
| (H) Calcium stearate | | | | | | 2 | |
| Banbury mixing temp. °C | 150 | 135 | 135 | 135 | 135 | 125 | 135 |
| Expansion temp. °C | 185 | 185 | 200 | 185 | 185 | 185 | 185 |
| Expansion percentage | 135 | 135 | 145 | 140 | 150 | 150 | 140 |
| Density in grams/cc | 0.93 | 0.88 | 0.84 | 0.8 | 0.67 | 0.67 | 0.8 |

In Table I, the terms reported under the heading "Item" refer to the following materials:

(A) A commercial terpolymer of acrylonitrile-butadiene-styrene manufactured under the trade name "Kralastic 2540"

(B) Azodicarbonamide (C) p,p'-Oxybis(benzenesulfonylsemicarbazide)

(D) Azobisformamide (G) p-Toluene sulfonylsemicarbazide

The composition ingredients as listed were compounded in a Banbury mixer operated approximately at the temperature indicated for the item with the ingredients being mixed until a fluxed homogeneous mass was obtained. The mixture in each case was then transferred to a sheeting mill and formed at the same temperature into a sheet about 6 mm. in thickness. Each resulting sheet was divided into smaller sections, some sections being placed in an air-circulating oven at the temperature indicated as the "Expansion temp." and heated for 15 minutes resulting in the expansion listed as percentage of final thickness divided by original thickness.

Other sections of each sheet were laminated (7 ply) in a press at 50 tons pressure for 10 minutes at 135° C. to outer sheets of nonexpanding ABS polymer composition prepared as described in Example 1. These laminated panels were then expanded between the heated platens of a press at 185° C. for 15 minutes to a variety of degrees of expansion by controlled setting of the distance between the press platens. Sheets of varying apparent density having good cell structure in the central foamed core, smooth outer surfaces and uniform strong adhesion between the surface sheets and the central core were obtained. A series of laminated sheets was thus prepared having densities of 0.83, 0.85, 0.88, 0.93 and 0.98 gram/cc. A group of laminated panels was also expanded in an air-circulating oven at 185° C. for 15 minutes. Sheets having apparent densities of 0.67 to 0.93 g./cc. were obtained, but some of these exhibited blisters between the outer surface sheets and the inner foamed core.

The heated press expanded sheets were successfully molded by vacuum forming into a variety of contours using both air-circulated ovens and radiant heated ovens for preheating prior to the forming step. The air-circulating method of heating produced molded articles having the highest degree of contour fidelity and best surface appearance.

DISCUSSION OF DETAILS

The use of any suitable thermoplastic material of the rigid, high impact type is contemplated for use in conducting the new methods of the invention, e.g., homopolymers and copolymers of olefins, acrylic esters, polyesters and comparable plastic materials now known or subsequently developed having high impact strength, good rigidity and moldability at elevated temperatures. However, the invention is advantageously applied to the formation of low density, rigid sheets from acrylonitrile-butadiene-styrene copolymers of the rigid, high impact type and preferably such polymers containing 50–80% acrylonitrile, 5–20% butadiene and 15–45% styrene. The invention is particularly useful with resins of this type having a softening point between about 125–150° C.

The use of any suitable heat decomposable blowing agent known to be useful in the formation of porous or cellular structures from thermoplastic materials is contemplated for the invention. However, it has been found that most advantageous results are obtained by the use of blowing agents from the class of azocarbonamides and sulfonyl semicarbazides. Azobisformamide and p-toluene sulfonyl semicarbazide are preferred examples of such blowing agents. Advantageously, the thermoplastic composition used in forming the central cellular core portion of the new lightweight plastic sheets will contain between about 5 to 25 parts by weight of such blowing agent for each 100 parts of the thermoplastic polymer in the composition.

The thermoplastic polymer used in forming both the skin layers and the cellular central core of the new lightweight sheets may be modified by incorporation of added materials in accordance with standard practice in the plastics art. Such additives may include molding or release lubricants, e.g., solid fatty acids in an amount about 0.1–2 parts per 100 parts of thermoplastic polymer; plasticizers in an amount about 0–25 parts per 100 parts of polymer and dyes, pigments, fillers, coloring agents or comparable additives in an amount about 0–25 parts per 100 parts of polymer. Also, oxidation inhibitors, heat and light stabilizers or the like in small amounts may be included, e.g., 1 to 10 parts per 100 parts of polymer.

Any suitable available or developed plastic forming and fabricating equipment may be used in carrying out the new methods of the invention. Roll mills, pug mills, Banbury mixers or the like may be employed in mixing together the various ingredients to form the plastic compositions from which the cellular central core and the surface layers of the new moldable sheets or panels are formed. Although the thermoplastic composition containing the blowing agent may be formed by simple mixing together of the blowing agent and the plastic base, it has been found that superior results are obtained if the blowing agent is first formed into a paste that is fluid at a temperature below about 50° C. by mixing together the blowing agent and a liquid plasticizer for the thermoplastic polymer and then milling or otherwise mixing together this paste with the polymer base. Advantageously, such a blowing agent paste will comprise 25–75% blowing agent and 25–75% of a liquid plasticizer.

Formation of sheets or slabs of the central core forming composition, as well as the surface films, is advantageously conducted on roll mills, sheeting calenders or comparable sheet or film forming equipment. Greater latitude in conditions used in forming the sheet or films for the surface layers is possible, than with the cellular core forming compositions. Formation of sheets or slabs of the core material is preferably conducted at a controlled temperature range of 125–165° C. The bonding of a central sheet, slab or ply of sheets to form the core portion with the surface sheets or films is also conducted preferably at a temperature in the range of 125–165° C. The step of heating the resulting laminate to expand the central portion into a cellular core is preferably carried out at a temperature in the range of 175–200° C. for a time which is generally inversely proportional to the temperature within the range of 1 to 60 minutes and preferably 5–30 minutes.

Although the central core portion can be formed from a single slab, it has been found advantageous to create this core section by plying together a plurality of thin sheets or slabs to the desired thickness.

The step of heating to expand the central core portion is conducted with the laminate in place between opposed flat surfaces which limit the extent of expansion of the structure to between about 1.5 and 3 times the thickness of the laminate prior to the expansion. Various types of equipment and limiting surfaces may be employed for this step, but flat or embossed platens of a press have been found to be useful for this purpose. The control of distance between such platens in the expansion operation may be attained by the use of shims or comparable gauging devices. If flat surface platens are employed, the resulting sheets will be found to possess smooth unblemished exterior surfaces. On the other hand, various grained or textured surface effects can be obtained by the use of embossed, engraved or similar surfaces in the platens.

CONCLUSION

By the use of new methods for the fabrication of rigid, high impact thermoplastic polymers as described above, it is possible to produce laminated plastic sheets of relatively low density comprising impervious surface layers and a cellular core. Such sheets or panels are free of surface blemishes or defects and have a high degree of strength and uniformity of adhesion between the separate layers of the product. The sheets are particularly useful in the production of molded articles by use of so-called vacuum-forming techniques.

The subject matter of the invention as described in the foregoing specification which is sought to be protected by United States Letters Patent is defined in the following claims.

We claim:

1. A method of producing low density rigid sheets of synthetic plastic material capable of being molded by vacuum forming into shaped articles which comprises:
   (A) providing a first thermoplastic composition containing a heat-activatable blowing agent, (B) forming said material into a sheet at a temperature below the activation temperature of said blowing agent, (C) sandwiching the sheet formed in step B between a pair of impervious sheets of thermoplastic material, (D) applying pressure to the exterior surfaces of the resulting sandwich sheet and heating the sandwich to an elevated temperature below said activation temperature to bond the separate sheets into an integral laminate, (E) placing the resulting laminate between opposed flat surfaces fixed apart a predetermined distance between about 1.5 and 3 times the thickness of said laminate, and (F) heating the laminate while between said surfaces above said activation temperature causing said blowing agent to expand said sheet of first thermoplastic composition, forcing the outer surfaces of said laminate into contact with said flat surfaces and creating a cellular interlayer in the laminate.

2. The method of claim 1 wherein said blowing agent is selected from the group consisting of azocarbonamides and sulfonyl semicarbazides.

3. The method of claim 1 wherein said first thermoplastic composition is composed principally of a copolymer of acrylonitrile, butadiene and styrene.

4. The method of claim 1 wherein said sheets of thermoplastic material are formed principally of a copolymer of acrylonitrile, butadiene and styrene.

5. The method of claim 1 wherein said first thermoplastic composition is prepared by forming a paste that is fluid at below 50° C. comprising said blowing agent and a liquid plasticizer and mixing said paste with a thermoplastic resin.

6. A method as claimed in claim 1 wherein said low density rigid sheet is uniformly heated to an elevated temperature at which the sheet may be molded, but below the temperature at which said cellular interlayer will collapse and the heated sheet is then vacuum formed into a shaped article.

7. A method as claimed in claim 1 wherein said thermoplastic composition consists essentially of the following ingredients and in the parts by weight indicated:

| | Parts |
|---|---|
| Acrylonitrile-butadiene-styrene terpolymer | 100 |
| Blowing agent selected from the group consisting of azocarbonamides and sulfonyl semicarbazides | 5–25 |
| Solid fatty acid | 0.1–2 |
| Plasticizer | 0–25 | said sheet thereof is formed in step B at a temperature in the range of 125°–165° C., said bonding of the sandwiched sheets in step (D) is preformed at a temperature in the range 125°–165° C., and said heating of the laminate in step F is preformed at a temperature in the range 175°–200° C.

8. A method as claimed in claim 7 wherein said thermoplastic terploymer contains 50–80% acrylonitrile, 5–20% butadiene and 15–45% styrene and has a softening point between about 125°–150° C.

9. A method as claimed in claim 1 wherein the resulting rigid sheets have a density of between about 0.5–0.9 g./cc. and a thickness between about 1 to 25 mm.

10. A method as claimed in claim 1 wherein the resulting rigid sheet consists of a single central core of foamed thermoplastic material and a pair of impervious outer layers of thermoplastic material having embossed exterior surfaces.

References Cited
UNITED STATES PATENTS

| | | | |
|---|---|---|---|
| 3,070,817 | 1/1963 | Kohrn et al. | 161—253 X |
| 3,206,354 | 9/1965 | Pooley | 161—161 |
| 3,220,901 | 11/1965 | Holmstrom et al. | 156—79 |
| 3,386,878 | 6/1968 | Pooley | 156—79 X |

HAROLD ANSHER, Primary Examiner

R. A. KILLWORTH, Assistant Examiner

U.S. Cl. X.R.

264—45, 55, 321